United States Patent
Sumida

(10) Patent No.: US 12,074,454 B1
(45) Date of Patent: Aug. 27, 2024

(54) DOUBLE-SIDED WIRELESS CHARGER

(71) Applicant: E-filliate, Inc., Rancho Cordova, CA (US)

(72) Inventor: Wesley K. Sumida, Fair Oaks, CA (US)

(73) Assignee: E-filliate, Inc., Rancho Cordova, CA (US)

( * ) Notice: Subject to any disclaimer, the term of this patent is extended or adjusted under 35 U.S.C. 154(b) by 466 days.

(21) Appl. No.: 17/533,665

(22) Filed: Nov. 23, 2021

Related U.S. Application Data

(60) Provisional application No. 63/139,492, filed on Jan. 20, 2021.

(51) Int. Cl.
| | |
|---|---|
| *H02J 7/00* | (2006.01) |
| *H02J 50/10* | (2016.01) |
| *H02J 50/40* | (2016.01) |
| *H02J 50/90* | (2016.01) |

(52) U.S. Cl.
CPC .......... *H02J 50/402* (2020.01); *H02J 7/0013* (2013.01); *H02J 50/10* (2016.02); *H02J 50/90* (2016.02)

(58) Field of Classification Search
USPC .......................................................... 320/108
See application file for complete search history.

(56) References Cited

U.S. PATENT DOCUMENTS

| | | | |
|---|---|---|---|
| 2005/0156560 A1* | 7/2005 | Shimaoka | H02J 7/0013 320/107 |
| 2013/0225077 A1* | 8/2013 | Schultz | H04B 5/79 455/41.1 |
| 2018/0198306 A1* | 7/2018 | Findley | G06F 1/263 |
| 2020/0244108 A1* | 7/2020 | Kim | H04B 5/79 |

* cited by examiner

*Primary Examiner* — Samuel Berhanu
(74) *Attorney, Agent, or Firm* — Heisler & Associates

(57) ABSTRACT

A wireless charger has two opposing surfaces including a top face and a bottom face. At least one coil within an interior of the wireless charger is couple able to a source of electric power and is configured to wirelessly charge a first battery powered wireless-charging-compatible electronic device adjacent to the top face and a second battery powered wireless-charging-compatible electronic device adjacent to the bottom face, without a wired connection between the battery powered electronic devices and the wireless charger. The wireless charger can in an alternative embodiment include two coils with an interior thereof, one for charging adjacent to the top face and one for charging adjacent to the bottom face. A cord delivers power to the coils, through appropriate intervening electronics.

16 Claims, 2 Drawing Sheets

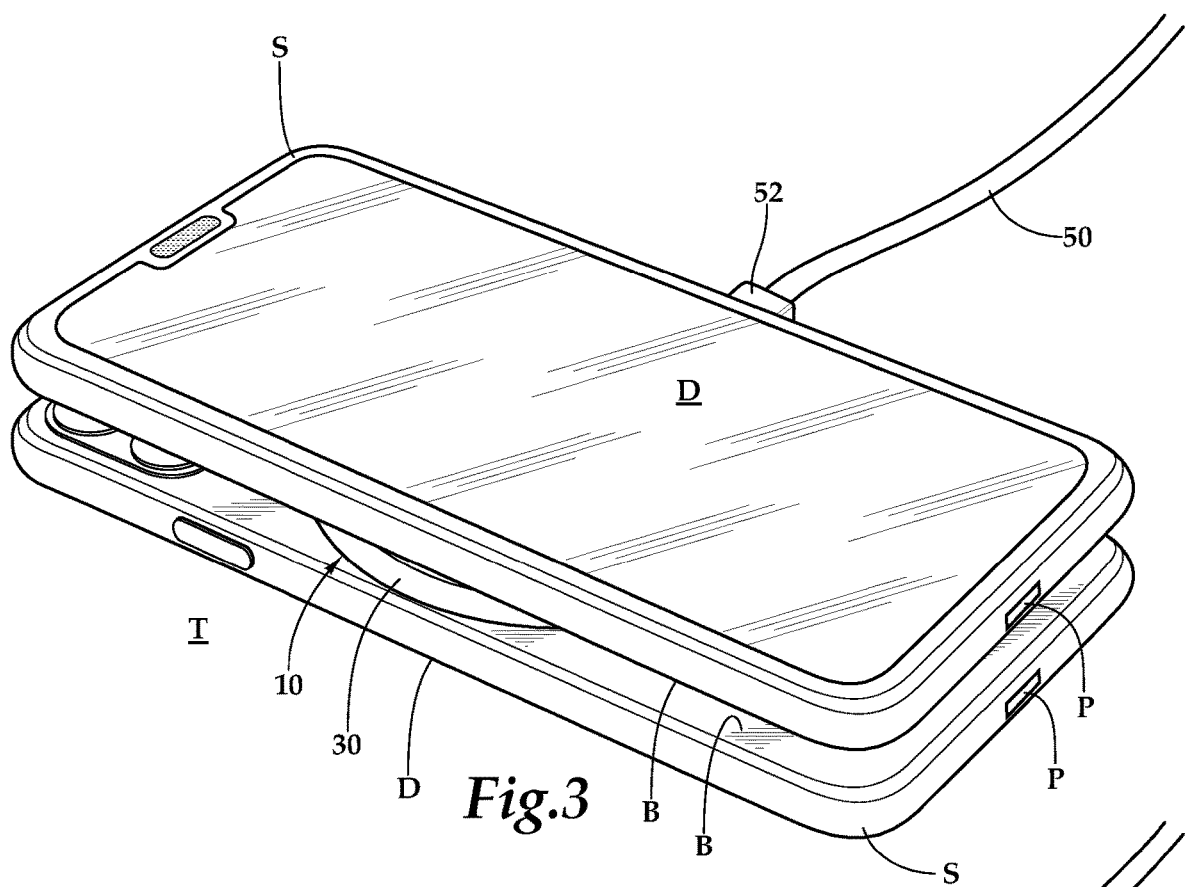
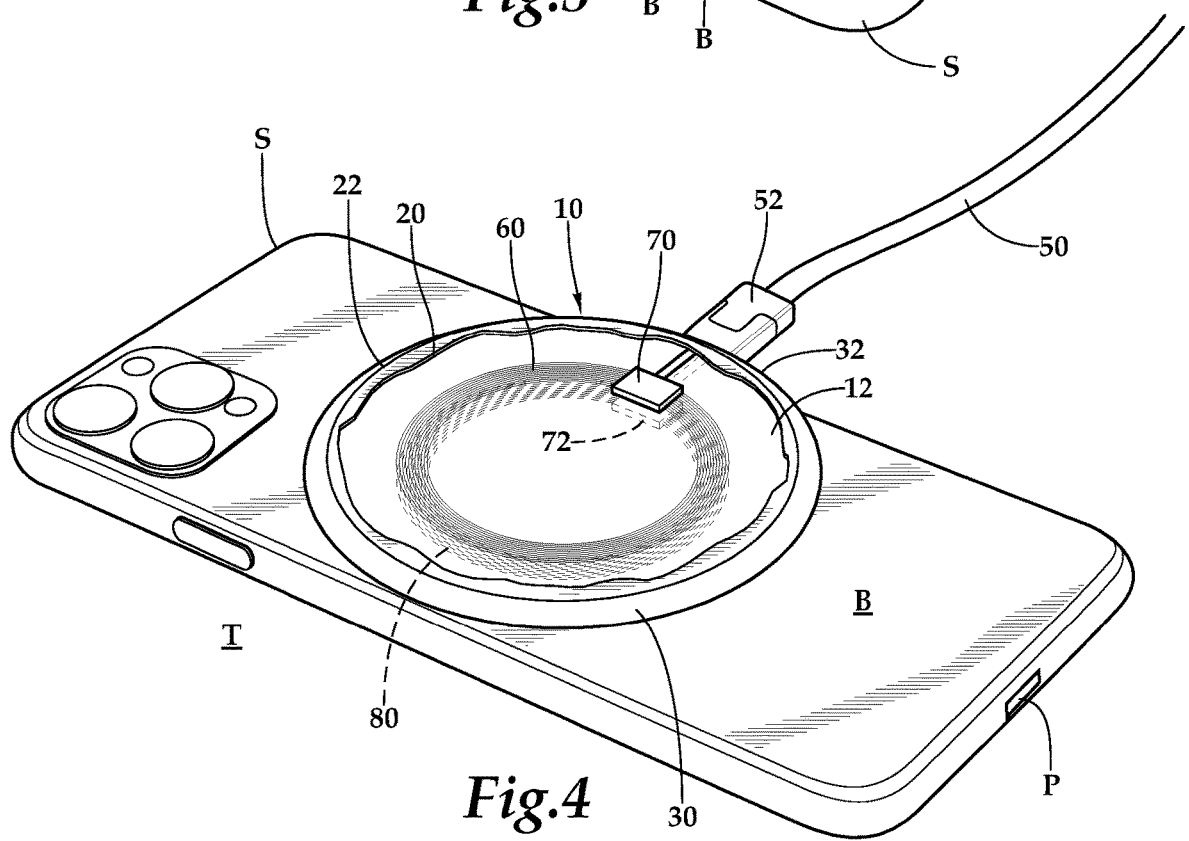

DOUBLE-SIDED WIRELESS CHARGER

CROSS-REFERENCE TO RELATED APPLICATIONS

This application claims benefit under Title 35, United States Code § 119(e) of U.S. Provisional Application No. 63/139,492 filed on Jan. 20, 2021.

FIELD OF THE INVENTION

The following invention relates to chargers for battery powered portable devices such as smartphones, and especially wireless battery chargers for such devices. More particularly, this invention relates to wireless chargers which can wirelessly charge multiple batteries of portable devices, simultaneously.

BACKGROUND OF THE INVENTION

Smartphones and other portable electronic devices have come into popular use for a variety of purposes, from communications to photography, note taking and operation of a variety of different software applications configured to run on such devices. These portable electronic devices, in addition to smartphones, can include digital music players, tablet computing devices, smartwatches, digital cameras and a variety of other devices in the "smart device" category or otherwise being portable electronic devices. One relatively common attribute of such devices is that they operate on battery power and utilize sufficient power that they typically require recharging on a regular basis, from multiple times a day to at least typically weekly or perhaps a little less often.

To charge such smart devices, and also for charging other portable electronic devices which might not be categorized within the "smart device" category, often a power cord is provided which attaches to a power input port on the smart device (or other portable electric device). The power cord typically takes power from a standard electrical outlet, but could take power from another battery or from a car charging port coupled to the car battery or other electronic system of the vehicle, or electric system of other vehicles, such as airplanes or trains, or power ports on computers or other devices (e.g. clock radios or lamps) which are often in the form of ports utilizing a universal serial bus (USB) format of some variety.

While utilizing cords for charging is generally effective, it does have some drawbacks. Cords generally clutter a work environment and can be prone to damage, and then cease operation. They can also present a tripping hazard in some cases. Furthermore, the charging port on a smartphone can become damaged and in extreme cases can cause the smart device to become inoperable, as it runs out of power and cannot be recharged unless repaired. Such cords can also become lost or a traveler can forget to bring their charging cord along on a trip. One solution to these problems inherent with corded power for portable electronic devices is the utilization of wireless charging. Many portable electronic devices are configured to be compatible with wireless charging, often referred to as "Qi charging," which is a wireless power transfer open interface standard. With such wireless charging, a portion of the portable electronic device (typically a back wall) is configured to be at least partially transparent to magnetic fields and a coil is provided within an interior of the device which is configured to scavenge power from an appropriate magnetic field exterior to the device. A wireless charger is provided which is also configured with such an appropriate electrically conductive coil, typically also within a housing of the charger which is transparent to magnetic fields. When the portable electronic device is brought close to the charger, inductive coupling between the two coils causes electric power to be transferred from the charger to the device, which power then charges the battery of the device (and can often also be used in real time to power electronics on the device). The charger can have a power source built into the charger, but most typically a charging cord extends from the wireless charger to a source of electric power, such as those described above.

While wireless charging is generally effective, it does have some drawbacks. One drawback is that many wireless chargers only charge one device. Often two individuals both need to have their portable electronic devices charged (or one individual with multiple devices needs to have both devices charged). For instance, an individual might have both a smartphone and a smartwatch which both need to be recharged. While such a user (or users) could merely utilize two wireless chargers, a need exists for wireless chargers which can simultaneously charge more than one device wirelessly.

One prior art device which somewhat addresses this need is it in the form of a charging pad mountable within a car which can support multiple smartphones on a surface and charge two smartphones at the same time (such as available at www.getjeda.com, accessed on Dec. 17, 2020 and provided by Jeda Products, Inc.). While somewhat useful, a relatively large surface area is taken up by this charging surface to accommodate the two smartphones resting thereon in a common plane and on a common surface. Accordingly, a need exists for more compact wireless chargers which can charge multiple portable electronic devices simultaneously. Compact chargers take up less space, both when stored in luggage (or otherwise) and when deployed for use.

SUMMARY OF THE INVENTION

With this invention, a wireless charger is provided which can charge two portable electronic devices simultaneously, within a compact space. The wireless charger has a top face and a bottom face. Both the top face and the bottom face radiate a magnetic field which can interact with coils within separate portable electronic devices for transfer of electric power through inductance power transfer therebetween.

In a typical use of the invention, a first smartphone or other device is placed face down upon a surface. A back wall of the device is facing upward. The wireless charger is placed upon the back wall of the first device with the bottom face of the wireless charger resting up on the back wall of the first device. Then, a second device is placed on top of the wireless charger with a back wall of the second device resting upon the top face of the wireless charger. In essence, the two devices make a "sandwich" with the wireless charger therebetween. Each smart device (or other portable electric device configured for wireless charging) can be charged simultaneously with such a double-sided wireless charger, in a compact arrangement.

In one embodiment, such as that disclosed in drawings included herewith, the wireless charger has a thin form with a circular perimeter. A thickness of the wireless charger is defined by a distance between the top face and the bottom face. Preferably, the top face and bottom face are each planar and parallel with each other. In one embodiment, a thickness of the wireless charger is about one centimeter. Most preferably, a diameter of the wireless charger is similar to a width of a typical smartphone, such as about two to four inches.

While the wireless charger can be utilized to charge two smartphones simultaneously, other uses could include charging a smartphone and a smartwatch simultaneously. As another option, the wireless charger could charge both a smartphone and a pair of wireless earbuds, if the wireless earbuds are configured for wireless charging. Similarly, other pairs of similar or different devices, which are configured for wireless charging, could be charged with the double-sided wireless charger of this invention.

While it is conceivable that a single antenna/coil could be configured and located, such as near the perimeter of the wireless charger, in a manner so that the single coil could provide power for charging both of the adjacent wireless charging configured devices, most typically two coils would be provided. For instance, a first coil would be adjacent to the top face and a second coil would be provided adjacent to the bottom face. The coil adjacent to the top face would provide wireless charging to a wireless-charging-compatible device adjacent to the top face. Similarly, a coil adjacent to the bottom face would provide for power transfer to a wireless-charging-compatible device, such as a smart device, adjacent to the bottom face. If necessary or beneficial, shielding could be provided between the first coil and the second coil in such an embodiment, such as in a layer between the two coils.

An interior of the wireless charger would also typically have appropriate electronics coupled to the coil or coils and provided for regulating voltage, current and other characteristics of electric current flow (through circuitry therein) to appropriately cause the wireless charger to function appropriately, as is known in the art of wireless chargers. In one embodiment, separate circuits would be provided, one to support the first coil adjacent to the top face and one to support the second coil adjacent to the bottom face. In a second embodiment, a single circuit would provide appropriate electric power to each of the coils (or a single coil) for operation thereof to charge two devices.

Electric power to the circuitry and on to the coils/antennas adjacent to the top face and/or the bottom face are typically provided through a cord (although a battery or additional wireless charging configurations could be utilized to transfer power to the wireless charger itself). The cord typically connects to the body of the wireless charger through a junction. This junction could merely be a strain relief type structure which is permanently attaching the cord to the wireless charger, or could be a removable coupling. If a removable coupling is provided at this junction, it can be provided according to one of various different power connector standards, such as USB-A, micro-USB or USB-C, to allow for compatibility between the wireless charger and various different cords. An end of the cord opposite the wireless charger typically is fitted with appropriate prongs for attachment to an electrical outlet, and can have a transformer thereon as needed to condition power passing through the cord, or it can be in the form of a coupling complying with some standards such as a USB standard, so that the end of the cord opposite the wireless charger can be removably plugged into similarly configured ports such as on a computer or other appliance, for supply of power through the cord to the wireless charger.

While the wireless charger is shown with a circular form when viewed from above, it could have some other form, such as an oval form or a faceted form (such as a square form). Materials from which of the wireless charger are formed include an exterior surface made of materials which allow a magnetic field to pass through with little or no disruption, to maximize effectiveness of the wireless charger. These surfaces also preferably are at least somewhat high in coefficient of friction, so that if a surface upon which the portable electronic devices are placed for wireless charging is not entirely horizontal, the wireless charger can help to hold the multiple wireless-charging-compatible devices stacked together in a manner in which the devices are unlikely to fall off of each other, even in a potentially vibrating/moving environment such as within an automobile or aircraft. A high coefficient of friction is considered to be at or above about 0.50. A moderate coefficient of friction, which would also be acceptable in many instances, would be at or above about 0.25.

While the wireless charger is typically provided with no retainer to hold itself to the adjacent portable electronic devices, various different brackets or retainers (or magnetic couplings (including those incorporated into the device and the chargers)) can be provided along with the wireless charger to keep the devices fixed in place relative to the wireless charger for optimal placement and to maintain the stack of the two smart devices and the wireless charger together, while recharging occurs.

OBJECTS OF THE INVENTION

Accordingly, a primary object of the present invention is to provide a wireless charger which can charge multiple wireless electronic devices simultaneously.

Another object of the present invention is to provide a wireless charger for charging batteries within smart devices which has a compact shape.

Another object of the present invention is to provide a wireless charger which can charge devices adjacent to a top face as well as charge a separate device adjacent to a bottom face.

Another object of the present invention is to provide a wireless charger which is portable, and can draw power from a variety of different power sources in a flexible fashion.

Another object of the present invention is to provide a method for wirelessly charging multiple battery powered devices with a single charger.

Other further objects of the present invention will become apparent from a careful reading of the included drawing figures, the claims and detailed description of the invention.

BRIEF DESCRIPTION OF THE DRAWINGS

FIG. 3 is a perspective view of that which is shown in FIG. 2.

FIG. 4 is a perspective view similar to that which is shown in FIG. 1, but with a portion of a top face of the wireless charger removed so that interior details of the wireless charger can be seen, and depicting interior structures of the wireless charger according to one embodiment.

DESCRIPTION OF THE PREFERRED EMBODIMENT

Figure 1:
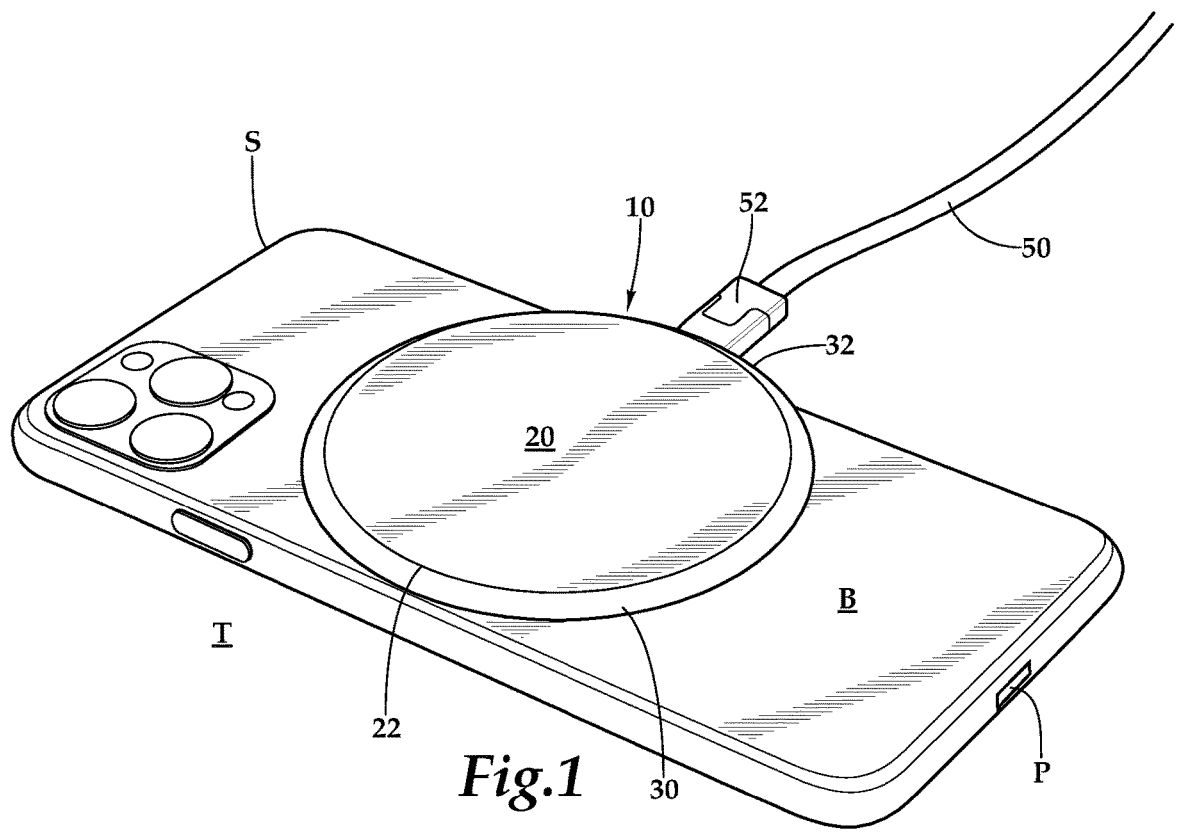
FIG. 1 is a perspective view of a smartphone with a wireless charger according to this invention adjacent thereto, and wirelessly charging the smartphone according to one embodiment of the invention.

Referring to the drawings, wherein like reference numerals represent like parts throughout the various drawing figures, reference numeral 10 is directed to a double sided wireless charger according to one embodiment of this invention (FIGS. 1-4). The wireless charger 10 is configured to allow for simultaneous charging of multiple wireless-charging-compatible devices, simultaneously. Examples of such devices include smartphones or other battery powered portable electronic devices.

In essence, and with a particular reference to FIG. 4, basic details of the wireless charger 10 are described, according to this example embodiment. The wireless charger 10 includes a top face 20 opposite a bottom face 40 with a perimeter 30 joining the top face 20 to the bottom face 40 at edges thereof. A cord 50 supplies electric power to an interior 12 of the wireless charger 10. Within the interior 12, a primary coil 60 is provided, coupled to the cord 50 through appropriate electronics 70. An optional secondary coil 80 can also be provided within the interior 12, with the primary coil 60 closer to the top face 20 and with the secondary coil 80 closer to the bottom face 40. A pair of wireless-charging-compatible devices, such as smartphones S, can be charged simultaneously, with one device adjacent to the top face 20 and the other device adjacent to the bottom face 40.

More specifically, and with continuing reference to FIGS. 1-4, details of the wireless charger 10 of this invention are described, according to an example embodiment. In this embodiment, the wireless charger 10, rather than being larger than the size of a typical smartphone S, is only approximately half of a size of a smartphone S, and in this example embodiment has a circular form with a diameter similar to a width of the smartphone S. With such a relatively small size, the wireless charger 10 is more able to conveniently be portable, such as to function as a travel accessory or to operate within a car or otherwise remain with a user to be available for use in many circumstances, when charging is required.

The wireless charger 10, in this embodiment, includes a planar top face 20 defining a first charging surface. The top face 20 is preferably parallel with and spaced from a bottom face 40 defining a second charging surface for the wireless charger 10. Each of these faces 20, 40 are preferably circular in form defined by a boundary 22 at a perimeter transition. A perimeter 30 joints the top face 20 to the bottom face 40. The perimeter 30 preferably has an arcuate form, gradually curving from being adjacent to the boundary 22 of the top face 20 to be adjacent to the bottom face 40. In one embodiment, the wireless charger 10 is reversible and can have the bottom face 40 utilized facing upward and with the top face 20 facing downward (or with the faces 20, 40 facing in a variety of other directions).

The faces 20, 40 are typically formed of similar materials. These materials are preferably selected to be relatively transparent to a magnetic field, such that wireless charging therethrough is facilitated. Furthermore, the top face 20 and bottom face 40 preferably have at least moderate coefficient of friction. With such friction, when a smartphone S has its back wall B provided adjacent to the top face 20 or bottom face 40, friction forces are present so as to discourage displacement of the smartphone S from off of this wireless charger 10, even if in a high vibration environment or being jostled about and/or with faces 20, 40 angled away from horizontal. Furthermore, if no horizontal surface T is available, if a somewhat angled surface might have a wireless charger 10 resting thereon, with appropriate friction forces associated with a coefficient of friction of the top and bottom face 40, the wireless charger 10 can remain in a fixed position upon such an angled surface and a back wall B of a smartphone S can remain engaged upon the top face 20 or bottom face 40 without the smartphone S sliding off of the wireless charger 10, or the wireless charger 10 sliding off of the smartphone S. While a coefficient of friction of 0.5 or higher is desirable, a coefficient of friction of 0.25 would be adequate in many instances.

The perimeter 30 preferably includes a port 32 thereon through which electric power can be provided to the wireless charger 10. This port 32 could be permanently fitted with a junction 52 at an end of the cord 50, or could be a port 32 which allows for removable attachment of the junction 52, such as so that the cord 50 can be removably attached to the body of the wireless charger 10, and with the cord 50 being potentially replaceable. Replacement might be desirable if cords 50 of different lengths might be provided and a cord 50 of optimal length may then be selected. Furthermore, if the cord 50 becomes damaged, a new cord 50 could be acquired and merely plugged into the port 32, in such embodiments.

Electric power is provided through the cord 50, with an end of the cord 50 spaced from the wireless charger 10 generally including a transformer and/or plug prongs thereon to facilitate connection to electric power, such as AC power within a residential building or other building. Alternatively, the end of the cord 50 opposite the wireless charger 10 could be provided with a cigarette lighter 12V coupling or a USB or other jack which would allow the end of the cord 50 opposite the wireless charger 10 to connect to ports on a computer or other device, such as a portable battery backup power supply.

Wiring within the cord 50 supplies electric power to the primary coil 60 (and optionally also the secondary coil 80 (FIG. 4)). Typically, such power is fed through electronics 70 (and optionally secondary electronics 72 associated with the secondary coil 80). Electronics 70 can condition power appropriately before it passes to the primary coil 60 (and optionally also the secondary coil 80) so that electric power having appropriate characteristics is supplied to the primary coil 60, for optimal wireless charging performance.

While the electronics 70 are shown (FIG. 4) in line with the primary coil 60, the electronics 70 could be closer to the perimeter 30 and outboard of the primary coil 60. As a further alternative, electronics 70 could be provided within an interior of the primary coil 60, closer to a center of the interior 12. The interior 12 is shown with some space between the coils 60, 80 and the perimeter 30. In various embodiments, the primary coil 60 (and optional secondary coil 80) could be provided directly adjacent to an interior of the perimeter 30, should maximization of diameter of the primary coil 60 (and optional secondary coil 80) be desirable.

If required, a boundary could be provided between the primary coil 60 and the optional secondary coil 80. Such a boundary could be impervious to magnetic fields, such as a layer of aluminum foil. With such a boundary, the primary coil 60 would only charge through the top face 20 and the secondary coil 80 would only charge through the bottom face 40. In an alternative embodiment, only the primary coil 60 is provided, and wireless-charging-compatible devices are provided adjacent to both the top face 20 and bottom face 40 and interact with the same primary coil 60 to charge both devices simultaneously.

Figure 2:
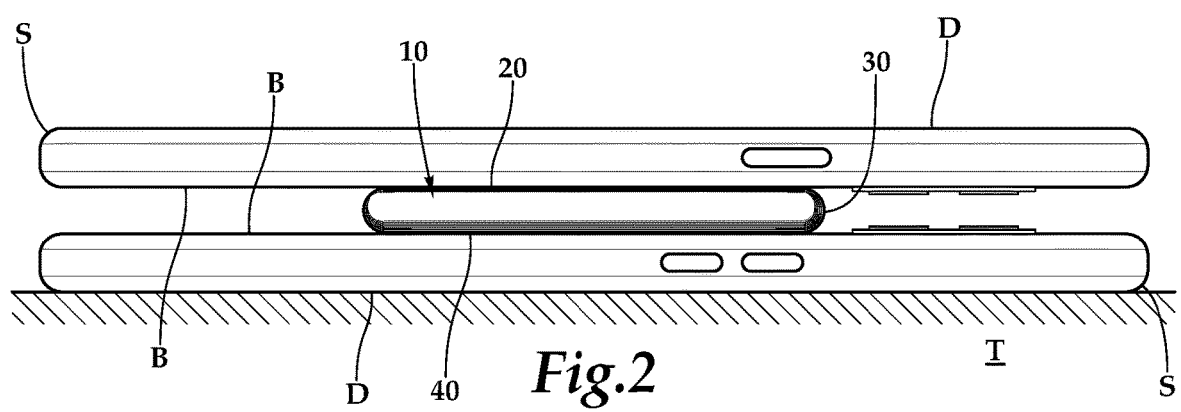
FIG. 2 is a side elevation view of a stack of two smartphones, each being charged by a single wireless charger therebetween.

In use and operation, and with particular reference to FIGS. 1-3, the charging method of this invention can be implemented, according to one embodiment. Initially, a smartphone S or other wireless-charging-compatible device is placed display D down upon a surface T, such as a tabletop upper surface. The back wall B of the smartphone S or other wireless-charging-compatible device is facing upwards. The wireless charger 10 is then placed upon the back wall B of the smartphone S, with the bottom face 40 adjacent to the back wall B of the smartphone S. The wireless charger 10 of this invention could be utilized in this configuration at this point, to charge a single smartphone S or other device. Such solo charging could also occur by placing the back wall B of the smartphone S (or other device) upon the top face 20 of the charger 10.

Most preferably, a second smartphone S or other wireless-charging-compatible device (or devices) is placed upon the top face 20 of the wireless charger 10. Such a second smartphone S or other additional device could include a smartphone S, or could include a smartwatch, or earbuds, or any other wireless-charging-compatible device. Electric power is transmitted from the wireless charger 10 to both smartphones S below the wireless charger 10 through the bottom face 40, and also the smartphone S (or other device) resting upon the wireless charger 10 through the top face 20. When charging is complete, or the devices are required to be used, they can readily be physically removed from the wireless charger 10, as the smartphones S or other wireless-charging-compatible devices are merely resting adjacent to the top face 20 and bottom face 40 of the wireless charger 10.

In one embodiment, magnets can be utilized within the wireless charger 10, and aligned adjacent to a coil within a smartphone S or other wireless-charging-compatible device, which magnets can interact together to provide an attractive force to both help to align the smartphone S or other device with the wireless charger 10 for optimal charging, and provide resistance to displacement from such an optimal relative position. Such magnets could actually be permanent magnets with north and south poles appropriately oriented to provide an attractive force, or one of the two portions of the magnetic coupling could be a magnet while the other portion of the magnetic coupling can merely be a ferrous material which interacts with the magnet to provide an attractive magnetic force.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When embodiments are referred to as "exemplary" or "preferred" this term is meant to indicate one example of the invention, and does not exclude other possible embodiments. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A double-sided wireless charger, comprising in combination:
    a body including a top face opposite a bottom face;
    said top face defining a first charging surface;
    said bottom face defining a second charging surface;
    at least one coil within an interior of said body; and
    said at least one coil coupled to an electronic power source and positioned to allow for wireless charging of a plurality of separate wireless-charging-compatible devices adjacent to both said first charging surface and said second charging surface, simultaneously.

2. The charger of claim 1 wherein said at least one coil includes a first coil closer to said top face than to said bottom face, and a second coil between said bottom face and said first coil, each said coil coupled to the electric power source.

3. The charger of claim 1 wherein said top face and said bottom face are each circular in form.

4. The charger of claim 1 wherein a power cord extends from a perimeter of said body and is removably coupleable to the electric power source, said perimeter located between said top face and said bottom face.

5. The charger of claim 1 wherein a surface of said top face and a surface of said bottom face each have a coefficient of friction of at least about 0.25.

6. The charger of claim 1 wherein at least one magnet is provided within said charger, positioned to assist in alignment of a coil of at least on of the wireless-charging-compatible devices with said at least one coil of the wireless charger.

7. The charger of claim 1 wherein said top face and said bottom face are planar and parallel to each other.

8. A method for charging multiple wireless-charging-compatible devices simultaneously, including the steps of:
    placing a first wireless-charging-compatible device upon a surface;
    positioning a wireless charger with a bottom face thereof upon the first wireless-charging-compatible device, the wireless charger including a body including a top face opposite the bottom face, the top face defining a first charging surface, the bottom face defining a second charging surface, and at least one coil within an interior of the body, the at least one coil coupled to an electric power source and positioned to allow for wireless charging of a plurality of separate wireless-charging-compatible devices adjacent to both the first charging surface and the second charging surface, simultaneously; and
    locating a second wireless-charging-compatible device upon the top face of the wireless charger.

9. The method of claim 8 wherein said placing step includes the first wireless-charging-compatible device being a smartphone with a display facing downward and a back wall facing upward, and with the wireless charger resting upon the back wall of the smartphone.

10. The method of claim 9 wherein said locating step includes the second wireless-charging-compatible device being a second smartphone placed with a back wall of the second smartphone facing downward and upon the top face of the wireless charger.

11. The method of claim 9 wherein said locating step includes locating a wireless-charging-compatible smartwatch upon the top face of the wireless charger.

12. The method of claim 9 wherein said locating step includes locating a pair of wireless-charging-compatible earbuds upon the top face of the wireless charger.

13. The method of claim 8 wherein the wireless charger includes at least two coils including a first coil closer to the top face than to the bottom face and a second coil between the bottom face and the first coil, each of the coils coupled to the electric power source.

14. The method of claim 8 wherein the wireless charger is configured with the top face parallel with the bottom face and with the top face and the bottom face each being planar in form and spaced apart by a perimeter at a border thereof.

15. The method of claim 8 including the further step of charging each of the wireless-charging-compatible devices simultaneously with power from the wireless charger.

16. The method of claim 8 including the further step of resisting displacement of the wireless charger from the wireless-charging-compatible device of said placing step through including a magnetic fastener between the wireless charger and the first wireless-charging-compatible device, the magnetic fastener including at least one magnet in a first one of the wireless charger and the wireless-charging-compatible device, and either a second magnet or a ferrous material in a second one of the wireless charger and the wireless-charging-compatible device, with the at least one magnet attracted to the magnet or ferrous material to provide the magnetic fastener.

* * * * *